Dec. 3, 1957   J. P. FRANCIS   2,815,244
VEHICLE RAIN VISOR
Filed Dec. 17, 1956
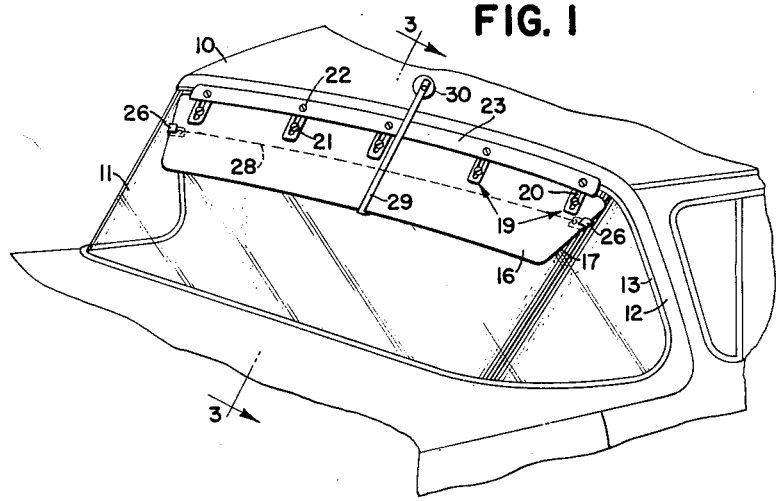
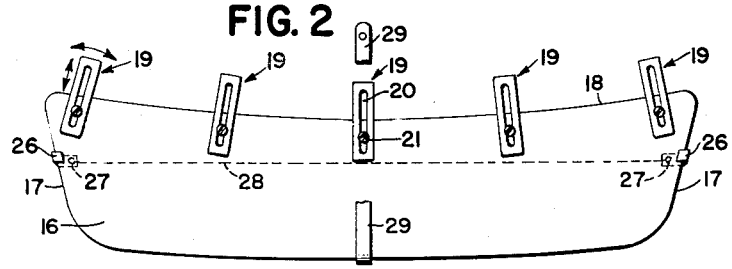
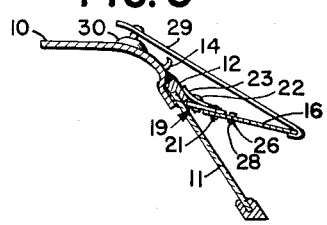
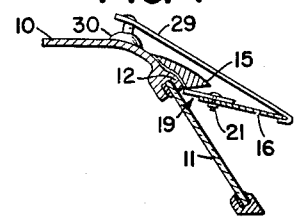
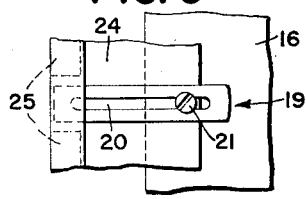
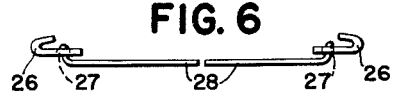
INVENTOR
John P. Francis

United States Patent Office 2,815,244
Patented Dec. 3, 1957

2,815,244

VEHICLE RAIN VISOR

John P. Francis, Haverhill, Mass.

Application December 17, 1956, Serial No. 628,612

5 Claims. (Cl. 296—95)

This invention relates to improvements in a windshield visor and the supporting means for supporting said visor, an object thereof being to provide a simple and an improved visor construction and supports adapted to engage the molding projection, rain gutter, or any one of the other projections extending forwardly and above the windshield area of a motor vehicle, the visor being supported in either rain sealing engagement or in spaced relation to the windshield, or a combination of both.

Another object is to provide supporting means for a laterally flexible visor which is very easily and quickly attached and supported to or above the windshield area by the rear supports, and including the outer support attached to the roof top of said vehicle, the visor and supporting means being removable in a like manner without any damage to the appearance of said vehicle.

Another object is to provide longitudinally adjustable rear supports for supporting the rear lateral portion of the visor to an extensive variety and range of motor vehicle windshields having different structural contours laterally and rearwardly at the top of said windshield areas.

A still further object is to provide protection to the windshield from rain or other objects of inclement weather when the vehicle is parked, such as in a drive-in theatre or other parking areas, thereby eliminating the use of the windshield wipers and providing a clean and clear windshield area for proper vision at all times.

With these objects and still others in view, as will hereinafter more fully appear, the invention comprises certain novel constructions, combination and arrangement of parts, hereinafter described and claimed, and illustrated in the accompanying drawings, in which:

Figure 1 is a perspective view of a portion of a motor vehicle showing the visor panel in rain sealing engagement, with the supporting means for supporting the said visor panel.

Figure 2 is a top plan view of the visor panel showing the longitudinally adjustable and pivotally mounted rear supports adjustably secured to the surface of the visor.

Figure 3 is a cross-sectional view taken on line 3—3 of Figure 1.

Figure 4 is also a cross-sectional view, modified, shown without any sealing strip on the visor, with the pronounced roof or molding projection providing a rain seal over the rear visor supports.

Figure 5 is a fragmentary top plan view of a thin rain sealing strip longitudinally movable with the support and shown supported in engagement with the rear support and the visor panel; and Figure 6 is a front elevation view of the flexible means and the hooks attached thereto adapted to engage the longitudinal sides of the visor panel.

Referring in detail to the drawings, the numeral 16 generally indicates the one piece longitudinally rigid and laterally flexible visor panel, which is shown supported over the windshield 11 by any number of the rear supports generally designated by the numeral 19 and by an outer support 29. The visor panel 16 may be constructed of any suitable laterally flexible or semi-rigid material such as sheet metal, fibre board, Masonite, or other composition.

The visor panel 16 (also referred to as the visor), as shown in Fig. 2, has a number of longitudinally adjustable and pivotally mounted rear visor supports 19, each support having a longitudinal slot 20 formed therein to receive a threaded bolt with attached nut 21 to adjustably secure each of said support 19 to an aperture formed on the rear portion of the visor. The visor panel 16 is preferably constructed of an arcuately contoured rear lateral edge 18, substantially as shown, to minimize the rearward projection of the rear support or supports 19 beyond the rear edge of the visor, which is in comparison to a substantially straight rear lateral edge, and to also serve as the preferred standard form for all motor vehicles.

A centrally mounted rear visor support 19 may be used to support the rear lateral portion of the visor panel, when the structural contour of the rear lateral edge is contoured sufficiently, so that each extreme outer end thereof engages the windshield area or molding projection for support thereto. A single central rear visor support 19 may therefore be provided for the adjustable support of the said visor panel.

Referring to Fig. 1, the visor panel 16 is shown in rain sealing engagement and supported in partial support by an outer support 29 secured to a vacuum cup 30 mounted on the roof top 10 of a motor vehicle. The support 29 with cup 30, along with a laterally flexible visor panel is shown and described in my copending application, Serial No. 439,953, filed June 29, 1954, now Patent No. 2,778,676. My invention is primarily concerned with the longitudinally and laterally adjustable rear supports 19 adapted for supporting the rear lateral portion of the visor panel, independently of the movable outer support 29, for any angular or longitudinal movement of said visor panel to or from a forwardly extending lateral projection above the windshield area of a motor vehicle.

In the angular movement of the visor panel 16 with respect to the windshield, the lowering of the visor angle increases the spaced opening between the rear lateral edge of the said visor panel and the windshield area in the vicinity of the center thereof, thus requiring the central rear support or supports 19 to be readjusted rearwardly. In the reverse procedure, raising the visor angle increases the spaced openings on each side rear lateral outward edge area, thus requiring the related rear supports 19 to be readjusted accordingly to maintain the support and rain sealing engagement between the rear lateral portion of said visor panel and the molding projection on the vehicle.

A longitudinally adjustable thin flexible sealing strip 23, Fig. 1, is shown adjustably mounted on the rear supports 19 by screws 22 engaging the longitudinal slots 20 to provide a rain seal over the spaced opening between the visor and the molding projection over the windshield area. Also in Fig. 5 is shown a fragmentary top plan view of a rear support 19 preferably constructed of a thin flat bar engaging the hem or sleeve 25 of a thin flexible sealing strip 24 such as transparent plastic, rubber, or other suitable flexible water repellent material. It is to be understood that the sealing strip is supported by the rear supports 19 and over the visor panel 16 for any rearward adjustment, and adapted to be laterally contoured in relation to the rearward projection of each adjustable rear support 19.

In Fig. 3, line 3—3 of Fig. 1, a rear support 19 is shown engaging the bottom of the molding projection 12 and supporting the visor panel 16 in spaced relation to the windshield area. The rear supports 19 are adapted to engage any desired projection for the support of the visor, such as the rubber strip 13 of molding 12, the rain gutter 14, or roof projection 15 of Fig. 4. Referring back to the roof projection 15, of Fig. 4, weather protection is provided for the visor panel and the supports 19 (as shown in Fig. 2) by retracting the said rear supports 19 to the minimum rearward projection.

Referring to Fig. 6, there is shown the visor engaging hooks 26 each being provided with an aperture 27 adapted to engage the line 28, or other suitable means, for the desired lateral spacing of the said hooks. The spaced apart relationship may be made permanent, whereby in moving the hooks 26 along the angled sides 17 of the visor panel 16, Fig. 2, the lateral contour may be regulated by the longitudinal movement of the said hooks 26. The hooks may be used to hold the visor panel 16 in a preheld or desired lateral contour when being erected, as a part of the erection, or when stowed away, or when the lateral flexibility of the visor panel due to the composition thereof, warrants the use of said hooks.

The rear supports 19 are preferably constructed with a straight rear lateral edge at the rear point of contact, the opposite or forward edge thereof having a rounded lateral edge, or other structural shape. This difference allows the supports to be adjustably secured on the visor in a reverse position to provide a structural change in the point of contact with the vehicle projection, above the windshield area, when such change is preferable.

Having described my rear visor supports, rain sealing means and the hook engaging means, I desire to add that the longitudinal slots may be formed in the visor panel 16 in lieu of the preferred slot 20 as formed in the rear visor supports 19. Also, that other forms of a visor support or supports may be used in combination with my rear visor support or supports.

From the foregoing description taken in connection with the accompanying drawings, it will be manifest that a visor supporting means for supporting a rain visor from the windshield area of a motor vehicle in rain sealing engagement, or in spaced relation thereto, or a combination of both, is provided that will fulfill all the necessary requirements of such a device, but as changes could be made in the aforesaid description and apparently different embodiments of the invention may be constructed within the scope of the appended claims, without departing from the spirit or scope thereof, it is intended that all matters contained in the said accompanying specification and drawings shall be interpreted as illustrative and not in a limitative or restricted sense. Changes therefore, in the construction and arrangement, may be made without departing from the spirit and scope of the invention as disclosed in the appended claims.

I claim:

1. An adjustable rain visor for the windshield of a motor vehicle comprising a flat one piece longitudinally rigid and laterally flexible visor panel, a visor support for supporting the front portion of said one piece visor panel, roof engaging means mounted on said roof top for supporting said support therefrom, and a longitudinally and laterally adjustable rear visor support pivotally mounted onto the flat surface of the rear portion of said one piece visor panel, the rear edge and the upper rear surface of the said rear visor support being adapted to freely engage the under surface of a forwardly extending lateral projection of said vehicle for adjustably supporting the rear lateral portion of said one piece visor panel in spaced and also related lateral contour of support with said lateral projection when flexibly attached thereto for lateral support and for the longitudinal and the angular adjustment of said one piece visor panel from the contact point of said rear visor support with said lateral projection of said vehicle.

2. An adjustable rain visor for the windshield of a motor vehicle as claimed in claim 1, and further including a line extending laterally across the bottom of said one piece visor panel, said line engaging laterally opposing longitudinally movable visor hooks, each hook being adapted to adjustably engage the longitudinal side edges of the one piece visor panel for regulating and holding the adjustable lateral contour of the said one piece laterally flexible visor panel in the related lateral contour of the forwardly extending lateral projection for support thereto.

3. An adjustable rain visor for the windshield of a motor vehicle comprising a flat one piece longitudinally rigid and laterally flexible visor panel, a visor support for supporting the front portion of said one piece visor panel, roof engaging means mounted on said roof top for supporting said support therefrom, and longitudinally and laterally adjustable rear visor supports pivotally mounted onto the flat surface of the rear portion of said one piece visor panel, said supports being flat and extending longitudinally and rearwardly of said one piece visor panel, the rear edge and the upper rear flat surfaces of said rear visor supports being adapted to freely engage the under surface of a forwardly extending lateral projection of said vehicle for adjustably supporting the rear lateral portion of said one piece visor panel in spaced and also related lateral contour of support with said lateral projection when flexibly attached thereto for lateral support and for the longitudinal and the angular adjustment of said one piece visor panel from the contact points of said rear visor supports with said lateral projection of said vehicle.

4. An adjustable rain visor for the windshield of a motor vehicle as claimed in claim 3, each of said rear visor supports being provided through the said flat surfaces thereof with a longitudinal slot adapted to adjustably engage the vertically mounted bolt means on the said one piece visor panel for individual longitudinal and lateral adjustment of each rear visor support.

5. An adjustable rain visor for the windshield of a motor vehicle as claimed in claim 3, and further including a thin flexible sealing strip adjustably supported by each individual rear visor support for forward or rearward movement as a longitudinally and laterally adjustable and laterally contoured rain sealing strip engaging said lateral projection upon the adjustment of each individual rear visor support.

References Cited in the file of this patent

UNITED STATES PATENTS

| | | |
|---|---|---|
| 1,309,352 | Christopher | July 8, 1919 |
| 2,542,409 | Guenther | Feb. 20, 1951 |
| 2,720,415 | Helvey et al. | Oct. 11, 1955 |